US006339741B1

(12) United States Patent
Ritter et al.

(10) Patent No.: US 6,339,741 B1
(45) Date of Patent: Jan. 15, 2002

(54) ENGINE SPEED CONTROL WITH RESUME FROM IDLE OR NEAR IDLE

(75) Inventors: Curtis Paul Ritter, Dearborn; Marleen Frances Thompson, Sterling Heights; Jeffery Scott Hawkins, Framington Hills, all of MI (US)

(73) Assignee: Detroit Diesel Corporation, Detroit, MI (US)

( * ) Notice: Subject to any disclaimer, the term of this patent is extended or adjusted under 35 U.S.C. 154(b) by 0 days.

(21) Appl. No.: 09/642,163

(22) Filed: Aug. 18, 2000

(51) Int. Cl.[7] ............................ F02D 9/00; G06F 15/02

(52) U.S. Cl. ....................... 701/110; 701/115; 123/350; 175/24

(58) Field of Search ................................ 701/101, 102, 701/103, 110, 115; 123/350, 352, 357, 361, 399, 400, 403; 175/24, 25, 38

(56) References Cited

U.S. PATENT DOCUMENTS

| | | | | | |
|---|---|---|---|---|---|
| 3,893,525 | A | * | 7/1975 | Dower et al. | 175/24 |
| 5,128,599 | A | * | 7/1992 | Nikolaus et al. | 123/352 |
| 5,215,056 | A | * | 6/1993 | Harada et al. | 123/352 |
| 5,586,536 | A | * | 12/1996 | Seo et al. | 123/352 |
| 5,592,385 | A | | 1/1997 | Katayama et al. | |
| 5,611,751 | A | | 3/1997 | Ehrenhardt et al. | |
| 5,757,161 | A | | 5/1998 | Ikkai et al. | |
| 5,769,051 | A | * | 6/1998 | Bayron et al. | 123/350 |
| 5,995,879 | A | * | 11/1999 | Ginzel et al. | 123/350 |
| 6,081,762 | A | | 6/2000 | Richardson et al. | |
| 6,260,647 | B1 | * | 7/2001 | Calamari et al. | 123/350 |
| 6,286,987 | B1 | * | 9/2001 | Goode et al. | 123/352 |

* cited by examiner

*Primary Examiner*—Willis R. Wolfe
(74) *Attorney, Agent, or Firm*—Brooks & Kushman PC

(57) ABSTRACT

A system and method for controlling engine speed of an internal combustion engine provide automatically returning to a set speed selected with a hand throttle after operating at idle or near idle. The system and method are particularly suited for operation in driving a mud pump used in petroleum drilling applications where the operator dials-in a desired operating speed corresponding to a desired pumping rate. The engine is returned to idle or near idle to allow additional sections of pipe to be added. The engine then automatically returns to the previously selected set speed without additional manipulation of the hand throttle. In one embodiment, dual hand throttles are provided to support remote station operation and control of the engine speed.

20 Claims, 4 Drawing Sheets

ENGINE SPEED CONTROL WITH RESUME FROM IDLE OR NEAR IDLE

TECHNICAL FIELD

The present invention relates to systems and methods for controlling engine speed of an internal combustion engine.

BACKGROUND ART

Electronically controlled internal combustion engines have a wide variety of applications which may include driving various machinery including pumps, for example. Diesel engines are often used to provide motive power to vehicles or vessels, in addition to powering auxiliary equipment using a power take-off (PTO) mode of operation and appropriate couplings which may include a geared transmission. Engines may also be used in stationary applications for powering generators, driving irrigation pumps, driving compressors, or in petroleum drilling applications, for example.

In one particular application, diesel engines have been used to power petroleum mud pumps which are used to supply fluid to a drilling bit when a well is being drilled. The drilling rig operator will carefully adjust the engine speed to achieve a desired pumping rate, typically using a hand throttle potentiometer. The optimum speed typically varies from job to job and may vary depending upon the characteristics of the area being drilled. Once the operator has dialed-in the appropriate speed, the engine continues driving the pump at that speed until a new section of drilling pipe must be added. At that point, the operator brings the engine back to idle and disengages the transmission or clutch to allow a new section of pipe to be threaded in place. After adding the new section of pipe, the operator must then gradually increase the engine speed and pumping rate to again dial-in the optimum speed for the current conditions. While stationary engines may be equipped with a constant speed/cruise control function, they do not allow resuming to a preselected engine speed from idle operation.

DISCLOSURE OF INVENTION

An object of the present invention is to provide a system and method for controlling an engine which provides the ability to automatically return to a selected engine speed from idle or near idle.

Another object of the present invention is to provide a system and method for controlling a diesel engine utilized in a pumping application to return to an operator selected set speed after running at an alternate or high idle speed.

A further object of the present invention is to provide a system and method for controlling an engine used in a petroleum drilling application to allow operators to return to a previously dialed-in engine speed after adding or changing pipe.

Yet another object of the present invention is to provide an engine with a cruise control function capable of resuming to a previously selected set speed from idle or near idle.

A still further object of the present invention is to provide a system and method for controlling an engine in a pumping application with throttle controls positioned at multiple locations such that the engine returns to a previously selected set speed from idle or near idle operation.

In carrying out the above objects and other objects, features, and advantages of the present invention, a method for controlling an engine used for a pumping application includes adjusting a throttle to select a desired engine speed, storing the desired engine speed in memory, reducing the engine speed to a speed at or near idle, and automatically returning the engine speed to the stored desired engine speed from idle or near idle.

A system for controlling an engine used in a pumping application includes at least one throttle to select a desired engine speed, at least one switch to indicate that the selected engine speed should be stored, at least one switch to indicate that the engine speed should be controlled to a previously stored engine speed, and an engine controller in communication with the switches and the at least one throttle, the engine controller operative to control the engine speed based on inputs received from the at least one throttle and the switches to control the engine speed to a previously stored engine speed from idle or near idle.

In one embodiment, at least two throttle controls are provided to remotely control the engine speed from corresponding control stations. The throttle controls may be any of a number of types including hand-operated, foot pedals, etc.

The present invention provides a number of advantages. For example, the present invention allows an operator to carefully select an operating speed for the engine for a particular application or operating condition, return the engine to idle, and subsequently automatically return to the previously selected engine speed from idle or near idle without further readjustment. In petroleum drilling applications, the present invention allows the operator to dial-in an appropriate speed for current conditions, return the engine to idle or near idle while adding or changing pipe, and return to the previously dialed-in engine speed without further adjustments using the throttle.

The above advantages, and other advantages, objects, and features of the present invention are readily apparent from the following detailed description of the best mode for carrying out the invention when taken in connection with the accompanying drawings.

BEST MODE FOR CARRYING OUT THE INVENTION

Figure 1:
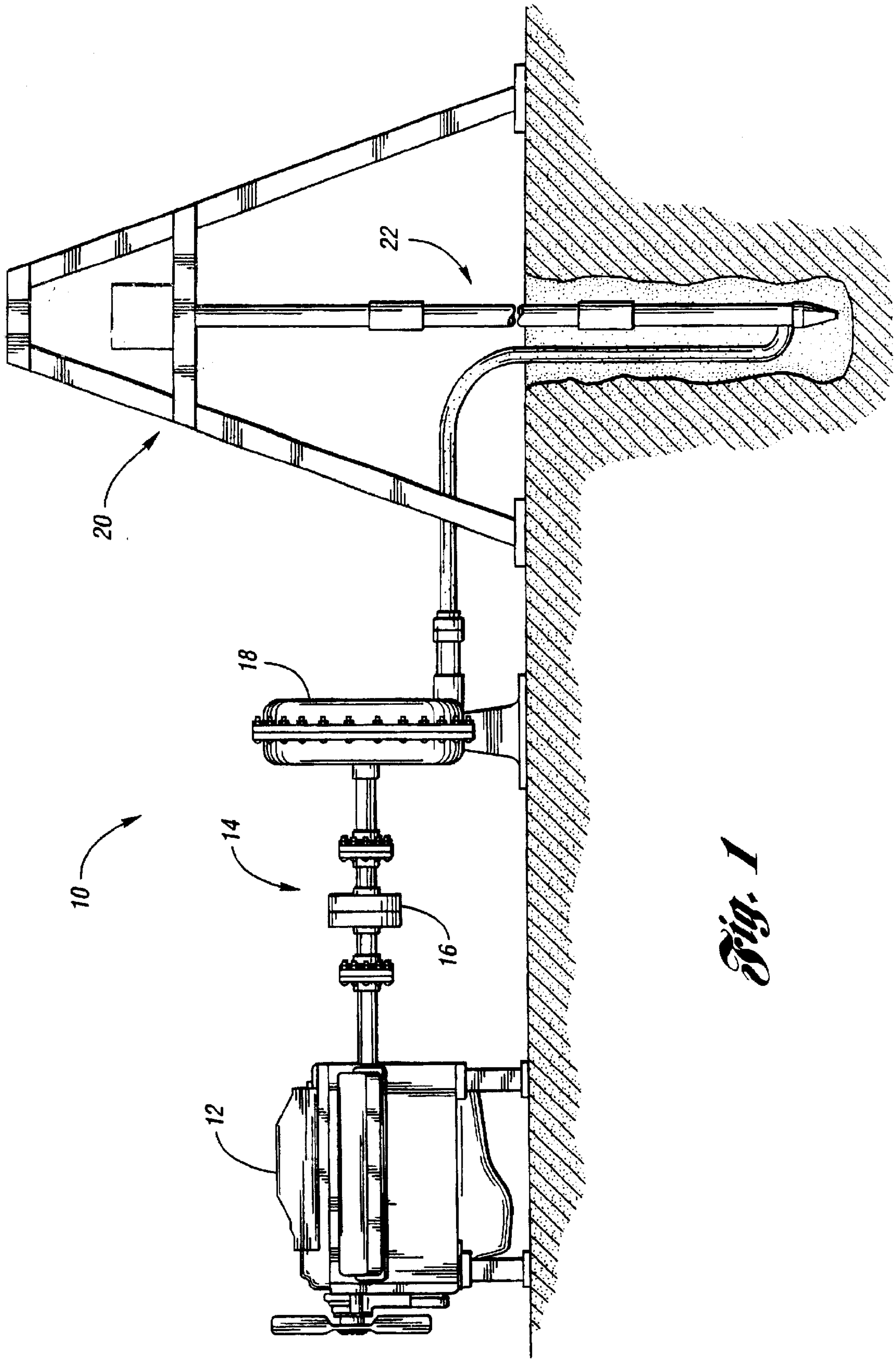
FIG. 1 is a schematic/block diagram illustrating operation of a system or method for engine speed control for a petroleum mud pump application according to one embodiment of the present invention.

FIG. 1 is a schematic/block diagram illustrating operation of a system or method for engine speed control for a petroleum mud pump application according to one embodiment of the present invention. System 10 includes an internal combustion engine 12, preferably a diesel engine, connected via a coupling 14 to a pump 18. Coupling 14 may include a clutch 16 and/or transmission (not shown). Drilling apparatus 20 is used to drive sections of drilling pipe 22 into the ground.

In operation, engine 12 is started and warmed up prior to connection to pump 18 via coupling 14. After engine 12 has warmed up, the operator carefully adjusts the engine speed until a desired pumping rate is obtained for the particular drilling conditions. Pump 18 is used to supply fluid to a drilling bit on the end of pipe sections 22 as the well is being drilled. The desired pumping rate, and therefore the desired engine speed, will vary from job to job. Once the operator dials-in the desired speed, preferably using a hand-operated throttle, he will maintain the speed until a new section of drilling pipe 22 must be added. At that point, engine 12 is brought back to idle and coupling 14 is disengaged while new pipe is added to sections 22. Because automatic speed control/cruise control will not resume from idle, prior to the present invention the operator was required to manually readjust the engine speed to obtain the desired pumping rate using the hand-operated throttle. As described in greater detail below, the present invention provides for automatically returning the engine speed of engine 12 to a previously stored desired engine speed from idle or near idle operation.

Figure 2:
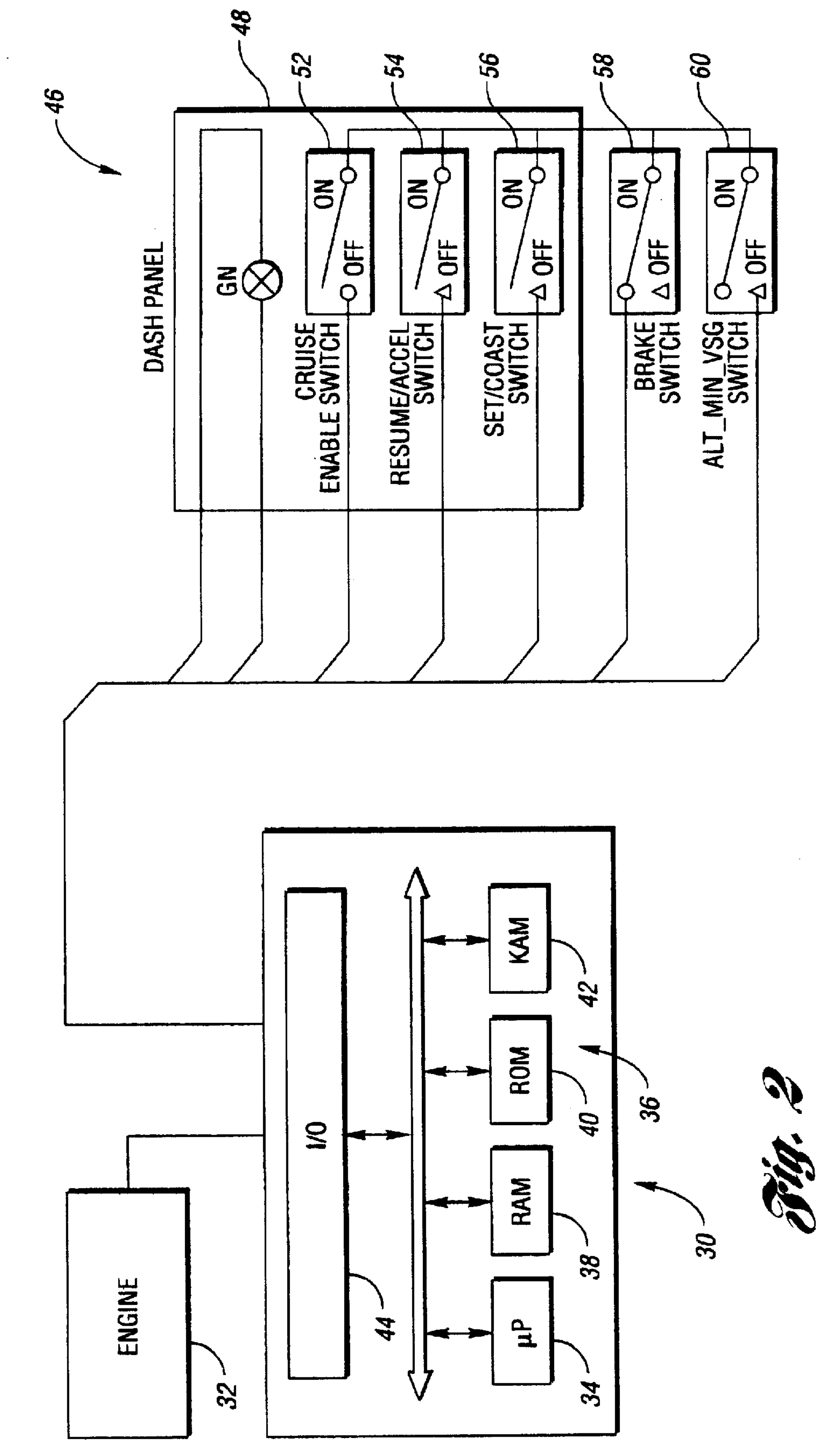
FIG. 2 is a schematic illustrating typical control switch connections for a system or method of controlling engine speed in pumping applications according to one embodiment of the present invention.

FIG. 2 is a schematic illustrating typical control switch connections for a system or method of controlling engine speed in pumping applications according to one embodiment of the present invention. Engine 12 is preferably controlled by an electronic engine control module (ECM) 30 which receives signals generated by various engine sensors and processes the signals to control various actuators such as fuel injectors (not shown) on engine 12. ECM 30 preferably includes one or more types of computer readable storage media, indicated generally by reference numeral 36, for storing data representing instructions executable by a computer to control engine 12. Computer readable storage media 36 may also include calibration information in addition to working variables, parameters, and the like. In one embodiment of the present invention, computer readable storage media 36 include a random access memory (RAM) 38 in addition to various non-volatile memory such as read-only memory (ROM) 40, and non-volatile RAM (NVRAM) 42. Computer readable storage media 36 communicate with microprocessor 34 and input/output (I/O) circuitry 44 via a standard control/address bus. As will be appreciated by one of ordinary skill in the art, computer readable storage media 36 may include various types of physical devices for temporary and/or persistent storage of data which may include solid state, magnetic, optical, and combination devices. For example, computer readable storage media 36 may be implemented using one or more physical devices such as DRAM, PROMS, EPROMS, EEPROMS, Flash Memory, and the like. Depending upon the particular application, computer readable storage media 36 may also include floppy disks, CD ROMs, and the like.

In a typical application, ECM 30 processes inputs, which may include various digital inputs represented generally by reference numeral 46 in addition to inputs from various types of sensors, by executing instructions stored in computer readable media 36 to generate appropriate output signals for control of engine 12. Various types of sensors and switches may be used to monitor and control engine 12 based on current operating conditions. For example, variable reluctance sensors may be used to monitor crankshaft position and/or engine speed. Variable capacitance sensors may be used to monitor various pressures such as barometric air, manifold, oil, and pump pressures. Variable resistance sensors may be used to monitor positions such as a throttle position which is preferably a hand-operated throttle for pumping applications. In one embodiment, a hand-operated throttle comprises a potentiometer which provides a variable resistance signal to ECM 30 indicative of a commanded engine speed.

In the embodiment illustrated in FIG. 2, digital inputs/outputs 46 may include various switches and/or lights mounted on dash panel 48 used to control engine 12 and provide information to the operator. In this embodiment, dash panel 48 includes a light 50 connected via a digital output to ECM 30 which indicates the automatic speed control mode is engaged. A cruise enable switch 52, resume/accelerate switch 54, set/coast switch 56, brake or clutch switch 58, and ALT_MIN_VSG or alternate idle switch 60 are provided to control the automatic speed control mode of engine 12. Preferably, enable switch 52 is a SPST switch while resume switch 54 and set switch 56 are momentary contact switches. Brake switch 58 is preferably a momentary contact, normally closed switch connected to ground. Switch 60 provides a digital input which causes engine 12 to operate at an alternate idle speed. The alternate idle speed is preferably above the normally programmed idle speed. In one embodiment, the alternate idle speed is about 50 rpm higher than the normal idle speed. Preferably, the alternate idle speed ranges between about 0 and 200 rpm higher than the regular idle speed. However, this value may vary depending upon the particular application.

In operation, after the engine has warmed up, the operator utilizes a throttle, such as a hand-operated throttle (FIG. 3), to dial-in the desired engine speed. The cruise enable switch 52 is engaged along with the ALT_MIN_VSG switch 60. Once the desired engine speed is dialed-in, set switch 56 is engaged and ECM 30 captures or stores the current engine speed as a desired set speed. The throttle is then returned to the idle position while the automatic speed control mode is active in controlling the engine speed to the desired set speed. When additional pipe needs to be added, brake switch 58 is momentarily engaged to disengage the automatic speed control mode and return the engine to the alternate idle speed. When the pipe has been added and the operator is ready to continue drilling, resume switch 54 is engaged to automatically return the engine speed to the previously determined set speed without additional manipulation of the throttle.

Figure 3:
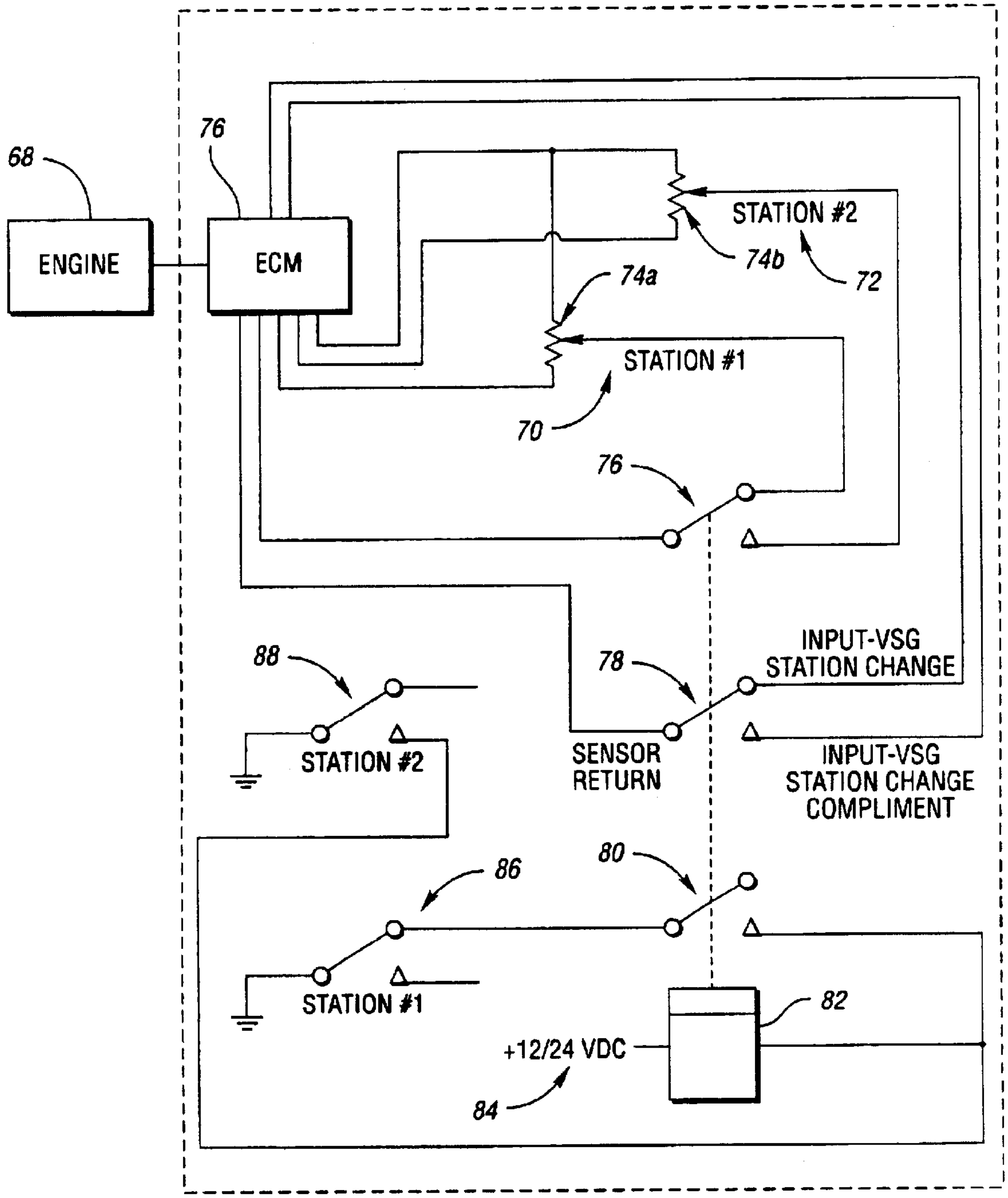
FIG. 3 is a schematic illustrating connections for a multiple throttle control according to one embodiment of the present invention.

FIG. 3 is a schematic illustrating connections for an optional multiple throttle control according to one embodiment of the present invention. The configuration of FIG. 3 allows the engine speed to be controlled by more than one throttle so that the throttles can be positioned at multiple control stations for various applications which may include petroleum drilling applications, fire truck applications, cranes, and the like. Throttle controls may include a hand throttle, a foot pedal assembly, a voltage divider circuit, or frequency input, among others. The multiple throttle implementation illustrated in FIG. 3 allows hand throttles 74A, 74B to be installed at multiple locations indicated by reference numerals 70 and 72, for example. Hand throttles 74A, 74B are preferably implemented using a variable resistance device such as a potentiometer. The implementation illustrated in FIG. 3 allows only one hand-operated throttle 74A, 74B to be active at any one time to provide a commanded engine speed to ECM 76 to control engine 68. Interlocked switches 76, 78, and 80 are controlled via a control relay 82 which is energized by power supply 84 based on the position of switches 86 and 88. ECM 76 monitors the switch inputs to determine the currently active hand-operated throttle control based on the position of switch 78. When the operator switches control from one hand-operated throttle to another, ECM 76 maintains the current engine speed until the newly selected throttle control is qualified by reducing the commanded engine speed for that throttle to idle and then increasing it to the current engine speed position. Once qualified, the engine speed is controlled by the newly selected hand-operated throttle. If qualification does not succeed within a predetermined time period, such as 30 seconds, engine speed will be ramped down from its current value to idle or the alternate idle speed if activated. If the newly selected throttle becomes qualified, the ramp down process will be stopped and the newly selected throttle will have control of the engine speed.

Figure 4:
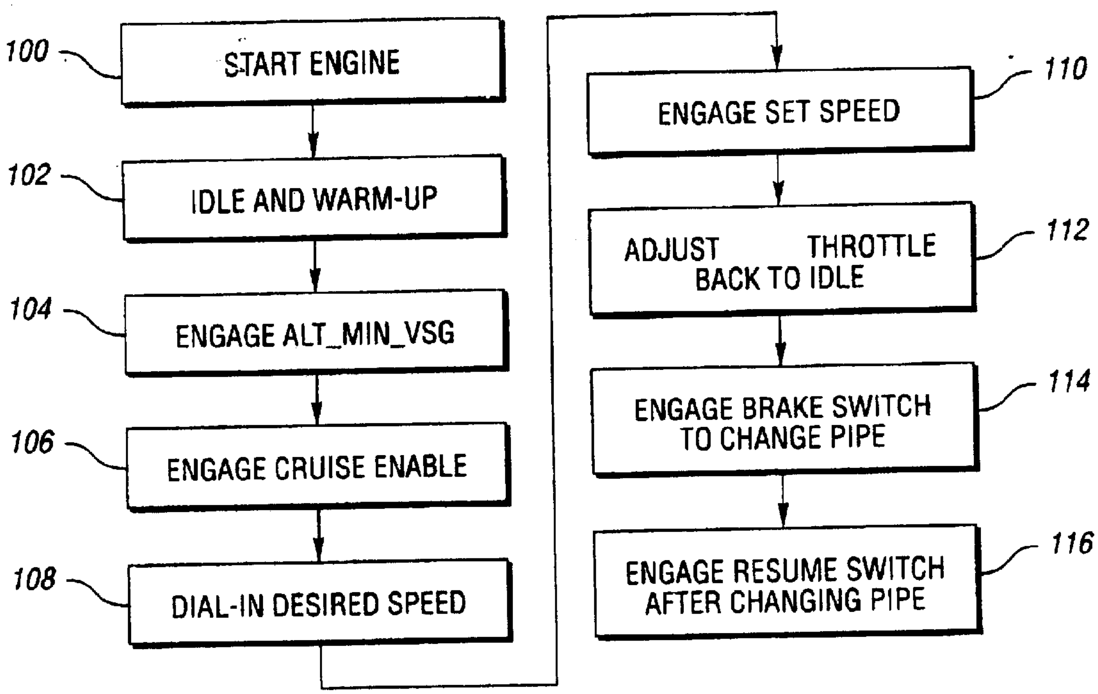
FIG. 4 is a flow chart illustrating operation of a system or method for controlling engine speed according to one embodiment of the present invention.
Figure 5:
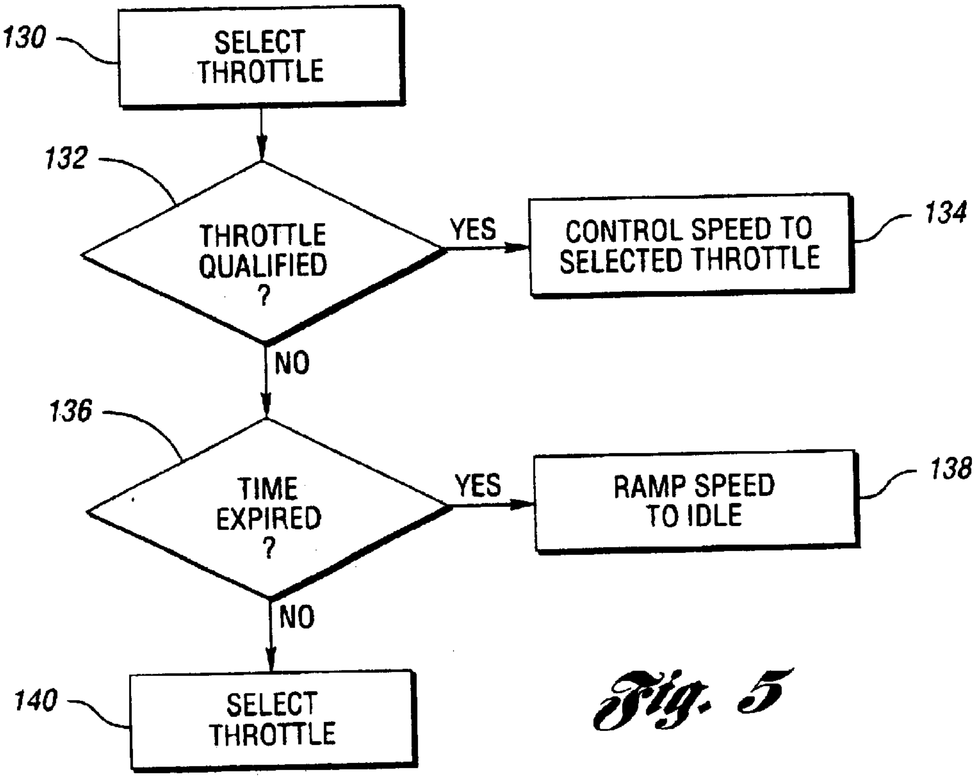
FIG. 5 is a flow chart illustrating operation of a system or method for controlling engine speed with dual throttle control according to one embodiment of the present invention.

FIGS. 4 and 5 are flowcharts illustrating operation of a system or method for controlling engine speed according to one embodiment of the present invention. As will be appreciated by one of ordinary skill in the art, the block diagrams of FIGS. 4 and 5 represent control logic which may be implemented or effected in hardware, software, or a combination of hardware and software. The various functions are preferably effected by a programmed microprocessor such as included in the DDEC controller manufactured by Detroit Diesel Corporation, Detroit, Mich. Of course, control of the engine may include one or more functions implemented by dedicated electric, electronic, or integrated circuits. As will also be appreciated by those of skill in the art, the control logic may be implemented using any of a number of known programming and processing techniques or strategies and is not limited to the order or sequence illustrated in the figures. For example, interrupt or event-driven processing is typically employed in real-time control applications, such as control of an engine rather than a purely sequential strategy as illustrated. Likewise, parallel processing, multi-tasking, or multi-threaded systems and methods may be used to accomplish the objectives, features, and advantages of the present invention. The invention is independent of the particular programming language, operating system, processor, or circuitry used to develop and/or implement the control logic illustrated. Likewise, depending upon the particular programming language and processing strategy, various functions may be performed in the sequence illustrated, at substantially the same time, or in a different sequence for accomplishing the features and advantages of the present invention. The illustrated functions may be modified, or in some cases omitted, without departing from the spirit or scope of the present invention.

In the various embodiments of the present invention, the control logic illustrated in FIGS. 4 and 5 is implemented primarily in software and is stored in computer readable storage media within the ECM. As one of ordinary skill in the art will appreciate, various control parameters, instructions, and calibration information stored in the ECM may be selectively modified by the engine owner/operator while other information is restricted to authorized service or factory personnel. The computer readable storage media may also be used to store engine operating information and diagnostic information for maintenance/service personnel.

Block 100 of FIG. 4 represents starting of the engine. The engine operates at the programmed idle speed until warmed-up as represented by block 102. The alternate idle or ALT_MIN_VSG switch is engaged as represented by block 104. In one embodiment, this modifies the engine idle speed by increasing it to about 650 rpm from about 600 rpm. The cruise enable switch is then engaged as represented by block 106. A hand-operated throttle is preferably used to dial-in the desired engine operating speed as represented by block 108. A set speed switch is then engaged as represented by block 110 to capture or store the desired set speed based on the current operating speed of the engine. The hand-operated throttle is then adjusted back to the idle position as shown at block 112. The engine speed will then be controlled by the automatic speed control mode to maintain the desired set speed. A brake switch or disengage switch is operated as represented by block 114 to return the engine to the alternate idle speed corresponding to the ALT_MIN_VSG speed which is preferably user selectable or calibratible. After completing the necessary operations, the resume switch is engaged to automatically return the engine to the previously selected set speed from idle or near idle. As used throughout the description of the invention and as will be appreciated by those of ordinary skill in the art, idle speeds will vary from application to application. At or near idle is intended to encompass settings within about 30% of idle speed. In one preferred embodiment, idle speed is set to 600 rpm while the alternate idle or ALT_MIN_VSG speed is set to 650 rpm.

FIG. 5 illustrates selection of a hand-operated throttle for multiple throttle controlled applications. As described above, the present invention contemplates the use of more than one throttle with only one throttle active at any particular time to control the engine speed. A throttle select or station select switch is used to indicate which throttle is desired to control the engine as represented by block 130. Before transferring control to the selected throttle, block 132 determines whether the newly selected throttle is qualified. In a preferred embodiment, the newly selected throttle is qualified by reducing its position to idle and returning the position to a position corresponding to the current engine speed. Once the throttle is qualified as determined by block 132, the engine speed is controlled based on the newly selected throttle position 134.

If the newly selected throttle control has not been qualified as indicated by block 132, block 136 determines whether a calibratible time period has expired. In one embodiment, the period is set to 30 seconds. If the time period has expired without throttle qualification, the engine speed is ramped down to idle or near idle as represented by block 138. Otherwise, block 140 maintains the current engine speed until a qualified throttle provides a new command.

As such, the present invention provides a system and method for automatically and/or remotely controlling engine speed of an internal combustion engine to return to a previously stored speed from at or near idle speed. The present invention allows operators to dial-in an engine speed using a hand-operated throttle control, return engine speed to idle or near idle, and then resume engine speed to the stored value without further manipulation of the hand-operated throttle. The present invention preferably uses a variable speed governor mode rather than a traditional cruise control mode which would require a vehicle speed sensor (VSS) for proper operation.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A method for controlling engine speed of an internal combustion engine having at least one throttle for selecting a desire engine speed, the method comprising:

storing an engine speed corresponding to current engine speed selected with the at least one throttle in response to a corresponding engine speed set command;

controlling the engine to automatically return to a previously stored engine speed in response to a resume engine speed command from idle or near idle without additional manipulation of the at least one throttle.

2. The method of claim 1 further comprising:

operating the engine at about 50 rpm above a programmed idle speed prior to automatically returning to the previously stored engine speed.

3. The method of claim 2 wherein the step of operating the engine includes receiving a command corresponding to an alternate idle speed, the alternate idle speed being about 50 rpm above the programmed idle speed.

4. The method of claim 1 further comprising:

controlling the engine to return to idle or near idle speed in response to receiving a brake signal.

5. The method of claim 4 wherein the engine is controlled to an alternate idle speed above the programmed idle speed.

6. The method of claim 1 wherein the internal combustion engine is in communication with a plurality of hand-operated throttle controls, the method further comprising:

selecting one of the plurality of hand-operated throttle controls; and controlling engine speed based on the selected hand-operated throttle control.

7. The method of claim 6 further comprising:

selecting another one of the plurality of hand-operated throttle controls; and maintaining current engine speed until the other hand-operated throttle control has been qualified.

8. The method of claim 7 further comprising:

decreasing engine speed to idle if the other hand-operated throttle control has not been qualified within a calibratible period of time.

9. The method of claim 7 further comprising:

controlling engine speed based on the other hand-operated throttle after the other hand operated throttle has been qualified.

10. The method of claim 7 wherein the other hand-operated throttle is qualified by manipulating the hand-operated throttle to command an idle speed followed by a desired set speed.

11. A method for controlling engine speed of an internal combustion engine driving a mud pump, the method comprising:

starting and idling the engine at a first idle speed;

engaging an alternate idle speed switch to increase engine speed to a second idle speed;

adjusting a hand-operated throttle to control engine speed to a desired speed;

engaging a set speed switch to store current engine speed as a desired engine speed;

engaging a brake switch to decrease engine speed to the second idle speed; and engaging a resume switch to automatically return engine speed to the desired engine speed with requiring manipulation of the hand-operated throttle.

12. The method of claim 11 further comprising:

selecting an active hand-operated throttle from a plurality of hand-operated throttle controls; and maintaining current engine speed until:

the selected hand-operated throttle control has been qualified by reducing commanded engine speed to idle followed by increasing commanded engine speed; or a predetermined time period has expired.

13. The method of claim 11 wherein the second idle speed is less than about 200 rpm above the first idle speed.

14. A system for controlling speed of an internal combustion engine, the system comprising:

at least one hand-operated throttle control for generating an engine speed command;

a set speed switch for generating a signal to store a current engine speed as a desired set speed;

a resume switch for generating a signal to automatically control engine speed to a previously stored desired set speed;

a brake switch for generating a signal to return engine speed to idle or near idle speed; and an engine controller configured to receive signals from the at least one hand-operated throttle control, the set speed switch, the resume switch, and the brake switch, the engine controller operative to control engine speed based on position of the hand-operated throttle, store current engine speed based on the signal from the set speed switch, return engine speed to idle based on the signal from the brake switch, and automatically resume engine speed from idle or near idle to the stored engine speed based on the signal from the resume switch.

15. The system of claim 14 further comprising:

an alternate idle speed switch for generating a signal to increase engine idle speed from a first idle speed to a second idle speed.

16. The system of claim 14 further comprising:

a second hand-operated throttle control for providing an engine speed command from a different location to the engine controller; and a throttle selection switch to select a currently active throttle to control the engine speed, wherein the engine controller maintains current engine speed after receiving a signal from the throttle selection switch until the selected hand-operated throttle switch has been qualified.

17. A computer readable storage medium having stored data representing instructions executable by a computer to control engine speed of an internal combustion engine having at least one throttle for selecting a desire engine speed, the computer readable storage medium comprising:

instructions for storing an engine speed corresponding to current engine speed selected with the at least one hand-operated throttle in response to a corresponding engine speed set command; and instructions for controlling the engine to automatically return to a previously stored engine speed in response to a corresponding resume engine speed command after operating at or near idle speed without additional manipulation of the at least one hand-operated throttle.

18. The computer readable storage medium of claim 17 further comprising:

instructions for operating the engine at about 50 rpm above a programmed idle speed prior to automatically returning to the previously stored engine speed.

19. The computer readable storage medium of claim 17 wherein the instructions for operating the engine include instructions for receiving a command corresponding to an alternate idle speed, the alternate idle speed being about 50 rpm above the programmed idle speed.

20. The computer readable storage medium of claim 17 further comprising:

instructions for controlling the engine to return to idle or near idle speed in response to receiving a brake signal.

* * * * *

UNITED STATES PATENT AND TRADEMARK OFFICE

CERTIFICATE OF CORRECTION

PATENT NO. : 6,339,741 B1

DATED : January 15, 2002
INVENTOR(S) : Curtis Paul Ritter, Marleen Frances Thompson and Jeffery Scott Hawkins It is certified that error appears in the above-identified patent and that said Letters Patent is hereby corrected as shown below:

Column 6,
Line 64, after "a" replace "desire" with -- desired --.

Column 8,
Line 41, after "a" replace "desire" with -- desired --.

Signed and Sealed this

Twenty-seventh Day of August, 2002

*Attest:*

JAMES E. ROGAN

*Attesting Officer*

*Director of the United States Patent and Trademark Office*